May 24, 1966  R. G. CAPELL ET AL  3,252,889
CRACKING CATALYST AND PROCESS OF CRACKING
Filed July 16, 1963
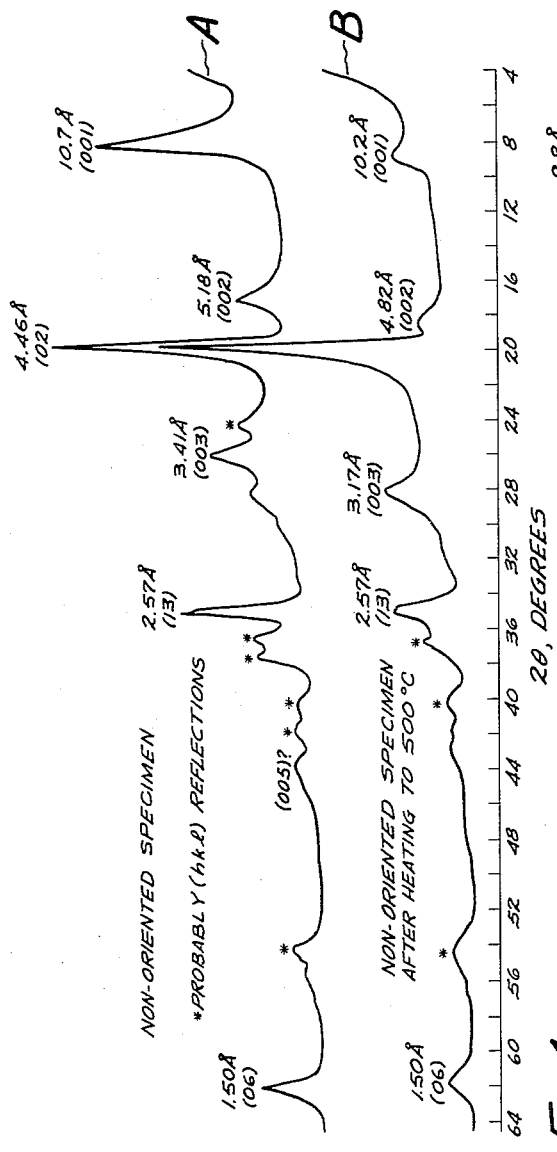
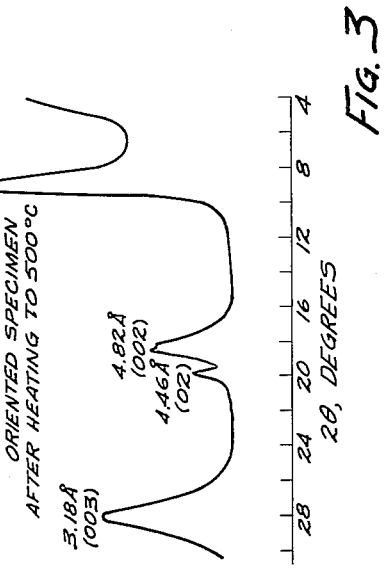
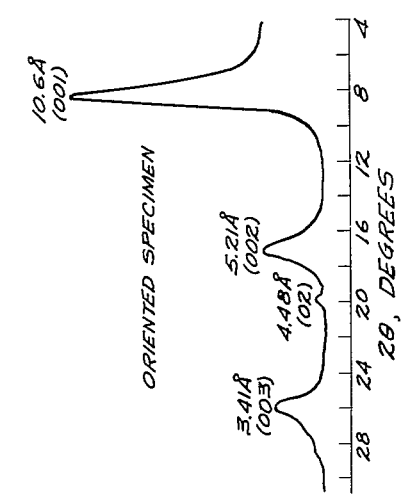
INVENTORS
ROBERT G. CAPELL &
WILLIAM T. GRANQUIST
BY
ATTORNEY

3,252,889
CRACKING CATALYST AND PROCESS OF CRACKING
Robert G. Capell, Pittsburgh, and William T. Granquist, Marshall Township, Allegheny County, Pa.; said Capell assignor to Gulf Research & Development Company, Pittsburgh, Pa., a corporation of Delaware, and said Granquist assignor to National Lead Company, Houston, Tex., a corporation of New Jersey
Filed July 16, 1963, Ser. No. 295,327
12 Claims. (Cl. 208—120)

This invention relates to the catalytic cracking of hydrocarbons and more particularly to the cracking of hydrocarbons in the presence of certain dehydrated synthetic silicate minerals as catalysts.

As is known in this art, petroleum hydrocarbons have been upgraded by treating them at elevated temperatures with various catalysts to effect cracking. Many such catalysts presently in commercial use comprise synthetic silica-alumina or silica-magnesia composites of amorphous nature. Generally, any crystallinity in such synthetic catalytic composites adversely affects hydrocarbon conversion and increases undesirable byproducts.

There has recently appeared in the patent literature, for example, in U.S. Patent 2,971,903 issued February 14, 1961, indications that certain crystalline zeolitic alumino silicates, generally known as molecular sieves and having uniform pore openings of the order of 4 to 15 Angstrom units, are active hydrocarbon cracking catalysts. It is known in the art that the crystalline molecular sieves are made up of an anionic three-dimensional framework (that is, the bonds are of similar strength in all three dimensions, leading to an iso-dimensional particle, as distinguished from a platy or fibrous habit) of $SiO_4$ and $AlO_4$ tetrahedra cross-linked by the sharing of oxygen atoms, the anionic charge being balanced by the inclusion in the crystal of an exchangeable cation.

It has now been discovered that a subgroup of another class of crystalline alumino silicates which are synthetic and are predominantly ordered in two dimensions, that is, which are lamellar or of a layered or stacked sheet structure, are highly active and selective hydrocarbon cracking catalysts. In accordance with the present invention, a hydrocarbon is subjected to hydrocarbon catalytic cracking conditions in the presence, as a catalyst, of a layer type crystalline material having the empirical formula: 2.4 to $3.0SiO_2:Al_2O_3:0.2$ to $0.6AB$, wherein the layer lattices comprise said silica ($SiO_2$), said alumina ($Al_2O_3$) and said B; wherein A is one equivalent of an exchangeable cation selected from the group consisting of hydrogen, alkali metal, and alkaline earth metal ions and mixtures thereof; and wherein B is one equivalent of an anion selected from the group consisting of fluoride, hydroxyl, and oxygen ions and mixtures thereof; said crystalline material being further characterized by a $d_{001}$ spacing within the range of about 9.6 Angstrom units to about 10.2 Angstrom units determined at 50 percent relative humidity.

As will be apparent, A can also be defined as $C/y$, where C is an exchangeable cation selected from the group consisting of hydrogen, alkali metal, and alkaline earth metal ions and mixtures thereof and y is the valence of said cation. Similarly, B can also be defined as $D/z$, where D is an anion selected from the group consisting of fluoride, hydroxyl, and oxygen ions and mixtures thereof and z is the valence of said anion.

The alkali metal ions employed include sodium, potassium, lithium and the like. The alkaline earth metal ions employed include calcium, barium, strontium and magnesium.

In the attached drawing:

FIGURE 1 shows tracings of the X-ray diffraction patterns of: (1) tracing A, a non-oriented specimen of synthesized silicate mineral precursor from which a catalyst of this invention is derived by dehydration, and (2) tracing B, a non-oriented specimen of a catalyst of this invention;

FIGURE 2 shows a tracing of the X-ray diffraction pattern of an oriented specimen of the same material employed for tracing A of FIGURE 1; and FIGURE 3 shows a tracing of the X-ray diffraction pattern of an oriented specimen of the same material employed for tracing B of FIGURE 1.

The terms "non-oriented" and "oriented," as used herein, refer to the manner in which the catalytic compositions and their precursors are disposed when employed as specimens for the purpose of obtaining X-ray diffractometer tracings. See, for example, pages 17 and 18 of the book, "The X-Ray Identification and Crystal Structures of Clay Minerals," by G. Brown (Ed.), London, 1961.

As has been indicated, the novel cracking catalysts of this invention are obtained by dehydrating certain precursor materials. These precursors are themselves novel synthetic silicate minerals and are described and claimed in the copending application of one of the inventors herein, William T. Granquist, Serial No. 212,829, filed July 27, 1962, the disclosure of which is incorporated herein by reference thereto. In order to provide a fuller understanding of the catalysts of this invention, the preparation and structure of the novel synthetic silicate minerals of said copending application will be briefly described.

As shown therein, said synthetic silicate minerals are of mixed layer crystal structure with randomly alternating layers of montmorillonite-like and mica-like clay mineral, with the proportion of mica-like layers ranging from about one-sixth to about five-sixths of the total, and have the empirical formula:

$$nSiO_2:Al_2O_3:mAB:xH_2O$$

where the layer lattices comprise said silica ($SiO_2$), said alumina ($Al_2O_3$), and said B, and where $n$ is from 2.4 to 3.0,
$m$ is from 0.2 to 0.6, A is one equivalent of an exchangeable cation selected from the group consisting of hydrogen, ammonium, alkali metal and alkaline earth metal ions and mixtures thereof, and is external to the lattice, B is one equivalent of an anion chosen from the group which consists of fluoride, hydroxyl, and oxygen ions and mixtures thereof, and is internal in the lattice, and $x$ is from 2.0 to 3.5 at 50 percent relative humidity, this component representing total water, interlamellar plus structural, as determined by ignition loss at 1000° C., said mineral being further characterized by a $d_{001}$ spacing of at least 10.4 Angstrom units but not more than 14.7 Angstrom units, determined at 50 percent relative humidity.

In accordance with the terminology in this art, by "external to the lattice" is meant ions which are not within the individual sheet units of silica tetrahedra and alumina octahedra, but occur between such sheets and around their edges.

As further shown in said copending application, in preparing said synthesized silicate minerals, there is placed into a water suspension suitable charges of silica; alumina; and an alkali metal, ammonium, or alkaline earth metal fluoride, hydroxide or mixtures thereof. The water suspension thus formed is brought under autogenous pressure to a temperature within the range of 280° C. to 315° C. In the pressure vessel where the reaction takes place, the water remains substantially in the liquid state and the pressure developed is that of the vapor pressure of the water itself at the temperature employed. Thus, at 285° C., for example, the pressure developed is 1000 pounds per square inch absolute (p.s.i.a.). The mixture is maintained at the selected temperature, usually and desirably with efficient agitation, for a long enough period of time for the desired synthetic silicate mineral to be formed. When this has taken place, the reaction mixture is then allowed to cool and the silicate mineral formed is recovered by any suitable process such as decantation, centrifuging or filtration.

The silica is employed in any convenient reactive form, but preferably one having a high surface area, so as to shorten the reaction time. For example, silica gel as obtained from sodium silicate solutions by removing alkali metal ions by any desired means is quite suitable. Also suitable is diatomite, especially when reasonably free of iron and other impurities. The silica may also be in the form of submicron size silica as obtained by fuming silicon tetrachloride; several such products are commercially available. Similarly, the alumina is preferably employed in a high surface area form. Thus, alumina gel may be precipitated from sodium aluminate substances by acidification followed by washing. Alternatively, alumina may be prepared by hydrolysis of aluminum isopropoxide and analogous compounds. Alumina in naturally occurring mineral form is potentially usable, although it is diffcult to obtain such material in a reasonably pure form. Commercially available trihydrate of alumina, gibbsite, or bayerite, is suitable as a source of alumina. It is convenient to prepare a mixed silica-alumina gel in the selected proportion and use this for further processing. The ammonium, alkali metal or alkaline earth metal fluorides or hydroxides or any mixture thereof are employed in any suitable form, normally by using the corresponding commercially available compound.

In order to obtain the desired synthetic silicate mineral catalyst precursors, the silica-alumina mol ratio must be within the range of 2.7:1 to 3.3:1, although not all of the silica enters into the synthetic mineral reaction product. The amount of "AB" constituent employed is that sufficient to yield the molar proportion of "AB" shown in the empirical formula hereinabove for the synthesized synthetic minerals of the copending application.

The pH of the reaction mixture initially, as measured at room temperature, may vary over a wide range. Generally speaking, the pH will be primarily determined by the constituents entering into the reaction mixture. Thus, where ammonium fluoride is used for the "AB" constituents in the characterization of the product given hereinabove, the pH will be relatively low and may be as low as 6.5 to 7. When, on the other hand, "AB" is furnished by a caustic alkali, such as sodium hydroxide or lithium hydroxide, then the pH will be relatively high, e.g., 10 or even higher.

The reaction time for optimum results will vary with the reaction mixture used, with the temperature of the reaction, and with the efficiency of agitation. Thus, it has been found that two days at a temperature of 285° C. gives good results. If the reaction time is greatly reduced, especially at lower temperatures, then the yield will be low since a relatively large proportion of the reaction mixture will remain unreacted. If reaction times are prolonged unduly, e.g., for 1 or 2 weeks, then extreme crystallization sets in and the novel synthetic silicate minerals are no longer obtained. At 280° C. about three days will generally be found optimum, while at 315° C. the optimum reaction time may be as short as one-half day. With efficient agitation, and with some reaction mixtures, the optimum time may be as short as one hour or even less at 300° C. From the above observations, the optimum reaction times within the temperatures stated, can be readily ascertained by those skilled in the art.

Finally, it is to be noted that the synthetic silicate minerals of the copending application as prepared in one ionic form can be base exchanged in known manner to obtain the mineral at least partly in another ionic form, both the initial ion and the ion exchanged therefor being those defined hereinabove as exchangeable cation "A."

Techniques of identification and of determining the crystal structure of clay minerals as set forth, for example, in Chapters 1, 4, 5 and 11 of the Brown book, cited above, have shown that the synthetic silicate mineral catalyst precursors of the copending application are not mere mechanical mixtures of mica-like and montmorillonite-like components, but contain these components in randomly interstratified order wherein the mica-like component is present in the approximate proportion of one-sixth to five-sixths of the total. Accordingly, instead of X-ray diffraction showing two separate peaks corresponding respectively to the mica-like and montmorillonite-like components, a single broad peak for the $d_{001}$ spacing is observed between about 10.4 Angstrom units and 12.0 Angstrom units for the case where the exchangeable cation, "A," is monovalent, and between about 10.4 Angstrom units and 14.7 Angstrom units where the exchangeable cation, "A" is divalent. Where both monovalent and divalent exchangeable cations are present, the limit of the upper range for the $d_{001}$ spacing falls between 12.0 and 14.7 Angstrom units. A typical X-ray diffractometer tracing for a non-oriented specimen of a synthetic mineral catalyst precursor (prepared as shown in the first two paragraphs of Example 1, infra) is shown in tracing A of FIGURE 1, and a similar tracing is shown in FIGURE 2 for an oriented specimen of the same material. Such materials show weak $hkl$ reflections; this is apparently related to limited order in three dimensions. Finally, the materials show a broadening of the $d_{001}$ spacing upon glycerol solvation; this is also indicative of the presence of the montmorillonite-like component.

In accordance with the present invention, the cracking catalysts earlier referred to are obtained from the synthesized silicate mineral catalyst precursors of the copending application by subjecting the latter to dehydration. Upon such dehydration the $d_{001}$ spacing of said catalyst precursors, namely, between about 10.4 Angstrom units and 12.0 Angstrom units in the case where the exchangeable cation "A" is monovalent and between about 10.4 Angstrom units and 14.7 Angstrom units in the case where the exchangeable cation "A" is divalent, collapses to a $d_{001}$ spacing of about 9.6 to 10.2 Angstrom units regardless of whether the exchangeable cation is monovalent or divalent. This collapse is irreversible and the samples are no longer capable of swelling. Thus, the glycerol solvation treatment described for the precursors no longer has any effect.

The removal of water, interlaminar plus structural, from the synthetic silicate mineral catalyst precursors results in a new and different chemical and, indeed, mineralogical species from the starting material. It is these dehydrated materials which constitute the cracking catalyst of the present invention.

Dehydration of the synthetic silicate mineral catalyst precursors is simply achieved by calcination. Such calcination can be carried out at a temperature in the range of about 600° to 1200° F., although higher temperatures, for example 1450° F., can also be employed. Preferably, a temperature in the range of about 700° to 1200° F. is used. A calcination temperature of 1050° F. for a period of 3 hours produces good results. If desired, the heating may be effected under vacuum or with the use of a purge gas, such as air. The catalyst precursors can also be employed directly in the hydrocarbon cracking process without prior dehydration, although prior dehydration is preferred, because at the temperatures encountered in the cracking process, the precursors will dehydrate to the active cracking catalysts of this invention.

A comparison of the X-ray diffractometer tracings of tracing A of FIGURE 1 and FIGURE 2, on the one hand, with the tracings of tracing B of FIGURE 1 and FIGURE 3, on the other, indicates the differences in structure between the catalyst precursor of the copending application and the catalyst of this invention. While the catalyst obtained by dehydration (prepared as shown in the last paragraph of Example 1, infra) retains the layer structure of the precursor, as shown in FIGURE 1, the $d_{001}$ spacing has collapsed from 10.7 Angstrom units to 10.2 Angstrom units. Actually, as shown in FIGURE 3, the collapse in the $d_{001}$ spacing is to 9.8 Angstrom units, as shown in FIGURE 3, because orientation of the specimen, as explained on page 17 of the Brown book cited, enhances the $00l$ reflections. All X-ray diffraction patterns were obtained with copper K α radiation as is usual in this art.

The catalytic cracking process of this invention is carried out under hydrocarbon cracking conditions which are themselves known in the art. For example, the cracking temperatures employed are normally within the range of about 600° to 1100° F. and preferably about 800° to 950° F. The pressure may range from substantially atmospheric to about 200 pounds per square inch. While lower boiling and higher boiling hydrocarbons can also be catalytically cracked in the presence of the catalyst of this invention, distillate petroleum oils boiling in the range above about 400° F., for example, naphthas, gas oils and the like are the usual charging stocks, particularly for the production of gasoline.

The following examples are further illustrative of the invention. In these examples the preparation of the precursor synthetic silicate mineral of the copending application is set forth for the sake of completeness.

*Example 1*

41 lbs. of sodium silicate solution, assaying 8.9% $Na_2O$ and having an $Na_2O:SiO_2$ mol ratio of 1:3.3, were dissolved in water and passed through a polystyrene sulfonic acid ion-exchange resin in the hydrogen ion form, so as to remove the sodium. The effluent from this treatment was a polysilicic acid sol having a pH of approximately 3. Into this effluent, which contained 10.67 lbs. of $SiO_2$ were dissolved 28.6 lbs. of $AlCl_3 \cdot 6H_2O$, and 46.5 lbs. of 28% aqueous ammonia were added with stirring. The pH rose to 10, and both the silica and alumina were brought down in the form of a gel, which was filtered and washed. The wet filter cake contained 10.25% by weight solids, and was used as such in the further processing.

1400 grams of the gel just described were washed twice with distilled water and made up to a final volume of 1.5 liters using distilled water. 8.8 grams of sodium hydroxide were then dissolved in this reaction mixture which was placed in an autoclave provided with a stirrer. The temperature was then raised to 285° C. and maintained at that point for 48 hours. The pressure was that corresponding to the vapor pressure of water at that temperature, viz., 1000 p.s.i.a. The autoclave was allowed to cool, and the product removed and washed again with distilled water, filtered and allowed to dry at room temperature to equilibrium with 50% relative humidity. The product resulting was a layer-lattice silicate mineral having the following approximate formula:

$$2.54SiO_2:Al_2O_3:0.52NaO_{1/2}:2.7H_2O$$

The product had a base exchange capacity of 197 milliequivalents per 100 grams of dry product, and exhibited a $d_{001}$ spacing of 10.7 Angstrom units (at 50% relative humidity). By consideration of X-ray diffraction data on the product obtained, well-known in this art and reviewed in Chapter 11 of the Brown book cited hereinabove, an interstratified structure of randomly alternating mica-like and montmorillonite-like layers was found to be present. Moreover, the approximate percentage of mica-like layers was found to be 70%.

In order to obtain the cracking catalyst of this invention, a portion of the wet product filter cake was redispersed in strongly ammoniacal water and again filtered, with the ammonium hydroxide treatment being carried through two cycles to reduce the amount of sodium ion by base exchange with the ammonium ion. Use of solutions of ammonium acetate or other ammonium salts in this step will also accomplish the desired result. The final filter cake was then redispersed in water to form a slurry. A portion of this slurry was filtered, and the dry cake ground to pass 30 mesh. The remainder of the product was spray-dried to micro-spheroids of median particle size of about 35 microns. Both dry products were heated to 500° C. for one hour. This treatment decomposed the ammonium ion to leave the products in hydrogen ion form. The products were highly useful as hydrocarbon cracking catalysts.

*Example 2*

80 grams of diatomite (practically pure silica) were added to 2 liters of distilled water, and 192.8 grams $AlCl_3 \cdot 6H_2O$ were dissolved in this mixture. With stirring, aqueous ammonia was added until the system became strongly basic. The mixture was the filtered and washed through 3 cycles and finally redispersed to a total volume of 2 liters. 6.40 grams of NaOH dissolved in a minimum amount of water were added to the slurry and this reaction mixture was then heated at 285° C. and 1000 p.s.i.a. for 2 days. The product slurry was filtered and washed.

The product was redispersed in strongly ammonical water and again filtered to reduce the amount of sodium ion by base exchange. This operation was carried through two cycles. The final filter cake was dried at 105° C.

The combined products of several such syntheses were ground through a laboratory hammer mill to yield material passing 16 mesh and a portion was then acid-washed at 95° C. for ½ hour using 10% HCl in order to reduce the iron content. The acid was used in large excess, and the treatment required three batches. The acid-washed product was washed with water and finally with aqueous ammonia. Subsequent study showed the presence of some $NH_4Cl$ as a residual impurity.

The dried material was ground by successive passes through a laboratory swing-hammer mill using a coarse screen, and material passing 200 mesh removed after each pass.

Analyses of the product gave the following results:

| Wet Chemical Analysis | "As-is" | Ignited at 500° C. for one hour |
|---|---|---|
| Ignition Loss, Percent | 15.23 | |
| $SiO_2$, Percent | 47.57 | 56.2 |
| $Al_2O_3$, Percent | 27.53 | 32.5 |
| $Fe_2O_3$, Percent | 1.35 | 1.6 |

Cation exchange results: Exchangeable cations: $NH_4+$ and $H+$. Cation exchange capacity: 85.1 meq./100 gms. of clay.

Example 3

6.15 lbs. of the same sodium silicate described in Example 1 were dissolved in 60 gallons of distilled water, heated to 150° F. and passed through a bed of polystyrene sulfonic acid ion exchange resin in hydrogen form, in order to prepare a polysilicic acid sol. The pH of the effluent was kept below a value of 3. To this sol were added 45 lbs. of $AlCl_3 \cdot 6H_2O$. When solution of this aluminum salt had been achieved, 40 lbs. of 28% aqueous ammonia were added in order to precipitate the silica and the alumina. At the end of this treatment, the pH had increased to 8.5. This co-precipitated gel was filtered and the filter cake repulped in distilled water and again filtered. This washing procedure continued through 5 cycles and resulted in a final chloride ion content of 0.2%. This final filter cake was dispersed in distilled water to a total volume of 60 gallons. No additional alkali was added beyond the ammonia remaining from the precipitation step. This final dispersion was then autoclaved at 545° F. and 1000 p.s.i.a. for 44 hours. The time required to bring this volume of slurry to temperature was 11 hours and the reaction product was allowed to cool for 35 hours before any further treatment. The product was removed from the autoclave, filtered and washed twice with dilute aqua ammonia and the washed filter cake dried at 210° F. overnight. Investigation of the cation exchange capacity of the product gave the following results:

|  | Meq. per 100 gms. dry product |
|---|---|
| Cation exchange capacity (total) | 148.3 |
| Exchangeable $Ca^{++}$ present | 2.3 |
| Exchangeable $Na^+$ present | 2.0 |
| Exchangeable $NH_4^+$ present | 144.8 |

No $Mg^{++}$ was detected.

The above product was calcined at 500° C. for one hour to drive off ammonia, thus producing the corresponding catalytic material in the hydrogen ion form.

Example 4

31.6 grams of kaolinite, 18.8 grams acid-washed diatomite and 1.82 grams of NaOH were mixed together in one liter of distilled water. The resultant slurry was placed in an autoclave and then treated hydrothermally under autogenous pressure at 300° C. for 5 days. The pH of the product slurry was approximately 6. This slurry was filtered and washed twice by re-slurrying in dilute aqueous ammonia and then washed twice with water, also by this re-slurrying technique. The final filtered cake was dried at 105° C.

The oven-dried material from the above was ground to 30–60 mesh and a portion of the granular product was heated to 700° C. for 2 hours and then cooled in air. This calcined product was placed in a small beaker, sufficient 1 N HCl added to make a slurry that was easily stirred, the mixture brought to boiling on a hot plate, removed and the HCl solution decanted once the granular material had settled to the bottom of the beaker. This cycle was repeated 3 times for the purpose of removing iron. The sample was then washed twice with distilled water and dried at 105° C.

Example 5

152 lbs. of sodium silicate solution as described in Example 1 were dissolved in 85 gallons of distilled water and converted to a polysilicic acid sol by an ion exchange procedure as described in Examples 1 and 3, 40.7 lbs. of trihydrate of alumina, assaying 64.9% $Al_2O_3$, were added to the silica sol and to this mixture was further added 3.48 lbs. of $NH_4F$ and 0.30 lb. $NH_4OH$. The final pH prior to treatment was 8.5. This slurry was heated in an autoclave at 285° C. and 1000 p.s.i.a. for 44 hours. The time required to reach this temperature was 11 hours. The autoclave charge was cooled with the aid of cooling coils over a four-hour period. The product was then recovered by filtration, washed, and dried in a tray drier at 98° C. overnight. The product was then calcined at 500° C. for one hour to produce the corresponding catalytic material in the hydrogen ion form.

An evaluation of several of the synthetic catalysts produced as set forth above was conducted by means of a microcatalytic technique described in the article entitled "A Semi-Automatic Microreactor for Use in Catalytic Research" by Hall, McIver and Weber, in Ind. Eng. Chem., 52, 421 (1959).

This microcatalytic technique yields the following experimental results: percent conversion of 2,3-dimethylbutane to products, catalyst sample weight contained in a fixed volume, and the apparent activation energy in kilo-calories per mol for the cracking of 2,3-dimethylbutane. The percent conversion together with the sample weight and surface area in square meters per gram of catalyst (determined by the well-known Brunauer-Emmett-Teller technique, using nitrogen as the adsorbate), can then be converted to a number which is related to the activity of a unit area of catalyst surface. This derived parameter is known as the specific activity and is obtained by dividing the percent conversion by the product of the surface area and sample weight, and then multiplying this result by the arbitrary factor of 100.

Because the percent conversion is definitely temperature dependent, a standard reaction temperature of 525° C. is employed in order that the cracking properties of catalysts may be properly compared. Where the percent conversion is reported as greater than 100%, this is an extrapolated value and simply means that 100% conversion actually occurred at temperature lower than 525° C.

Table I below lists the several cracking catalysts produced in the above samples and the several parameters obtained by the described microcatalytic technique. Included in this table are corresponding values obtained with three different commercial silica-alumina cracking catalysts. Sample "A" is a low alumina synthetic silica alumina catalyst; Sample "B" is a high alumina form of commercial catalyst "C"; and Sample "C" is a natural halloysite clay catalyst.

TABLE I

| Product from Example No. | Percent Conversion, 525° C. | Specific Activity | Surface Area, m.²/gm. | Activation Energy, kcal./mol |
|---|---|---|---|---|
| 1 | 75 | 21.1 | 120 | 18 |
| 2 | 101 | 15.5 | 99 | 18 |
| 3 | 171 | 31.8 | 91 | 24 |
| 4 | 49 | 30.6 | 129 | 20 |
| 5 | 82 | 15.3 | 94 | 19 |
| A | 70 | 5.4 | 425 | 21 |
| B | 41 | 5.2 | 163 | 18 |
| C | 51 | 8.4 | 115 | 18 |

As will be evident from this table, the catalysts in accordance with this invention generally produce higher percent conversions and have much higher specific activities than any of the commercial catalysts listed.

In further evaluating the cracking catalysts of this invention, comparisons were made of certain physical properties of (a) the catalyst of Example 1, (b) a low alumina synthetic commercial silica-alumina cracking catalyst and (c) a commercial sulfur-resistant natural halloysite cracking catalyst. These comparisons were made both before and after a steam aging treatment for a period of 8 hours at a temperature of 1100° F. and a pressure of about 30 p.s.i.a., followed by treatment with hydrogen sulfide for 2 hours at 1100° F. and a pressure of about 20 p.s.i.a. The treatment with steam and hydrogen sulfide is used in the evaluation of hydrocarbon cracking catalysts. Stability against the effects of such treatment is highly desirable. In the following table, there are shown the chemical compositions and the physical properties of the cracking catalysts tested.

TABLE II

| Catalyst Description | Catalyst of Example 1 | Low Alumina Synthetic | Sulfur Resistant Natural |
|---|---|---|---|
| Chemical Composition, percent by weight: | | | |
| Silica ($SiO_2$) | 54.5 | 86.6 | 60.9 |
| Alumina ($Al_2O_3$) | 38.2 | 13.4 | 38.2 |
| Iron (Fe) | 0.020 | <0.05 | 0.10 |
| Nickel (Ni) | 0.004 | <0.007 | 0.014 |
| Vanadium (V) | 0.001 | <0.007 | 0.010 |
| Sodium (Na) | 0.62 | <0.10 | <0.10 |
| Volatiles, percent by weight (3 hr. at 1,050° F.)—Physical Properties: | | | |
| Surface Area, m.²/g | 115.4 | 579 | 160 |
| Pore Volume, cc./g | 0.338 | 0.66 | 0.30 |
| Pore Diameter, Angstrom Units | 117 | 46 | 73 |
| Catalyst After Steam—8 hr., 1,100° F., 30 p.s.i.a. followed by $H_2S$ 2 hr., 1,100° F. 20 p.s.i.a.— Physical Properties: | | | |
| Surface Area, m.²/g | 104.0 | 285 | 79 |
| Pore Volume, cc./g | 0.319 | 0.56 | 0.26 |
| Pore Diameter, Angstrom Units | 123 | 79 | 137 | defined as 100% minus the weight percent on the oil charged of unconverted gas oil having a boiling point in excess of 410° F. and obtained as bottoms from the distillation. Since the pressure required to pass the oil over the catalyst varies with catalyst size, adjustments are made in conversion and carbon yield to a standard pressure (atmospheric pressure). The logarithms of conversion and coke yield are linear with the logarithm of process time. This permits of extrapolation to a 3 minute process time which is typical of the residence time of catalysts in commercial fluid catalytic cracking reactors. In the following table, the downflow activity test results obtained for the steam and $H_2S$ treated catalyst of Example 1 are compared with the results obtained for a commercial equilibrium alumina synthetic cracking catalyst, a commercial equilibrium sulfur-resistant natural halloysite cracking catalyst, and a steam and $H_2S$ treated fresh sulfur-resistant natural halloysite catalyst. As used herein with reference to a catalyst, the term "equilibrium" refers to an active cracking catalyst which has been withdrawn from a commercial catalytic cracking unit, the catalyst having an average age on the order of several months.

TABLE III

| Catalyst Description | Catalyst of Ex. 1 After Steam+$H_2S$ Treatment | Commercial Equilibrium Low Alumina Synthetic | Commercial Equilibrium Sulfur-Resistant Natural | Sulfur-Resistant Natural After Steam +$H_2S$ Treatment |
|---|---|---|---|---|
| DOWNFLOW ACTIVITY TEST | | | | |
| 60-Minute Test: | | | | |
| Conversion, percent by wt. | 45.1 | 32.0 | 23.1 | 23.0 |
| Coke, percent by wt. | 1.84 | 0.73 | 0.41 | 0.72 |
| Carbon Factor (C) | 1.17 | 1.22 | 1.64 | 2.88 |
| Gas Gravity (Air=1) | 1.322 | 0.987 | 0.955 | 0.760 |
| Gasoline, percent by wt. | 31.3 | 25.7 | 20.9 | 19.1 |
| 20-Minute Test: | | | | |
| Conversion, percent by wt. | 59.4 | 39.8 | 29.8 | 32.1 |
| Coke, percent by wt. | 3.87 | 1.53 | 0.82 | 1.44 |
| Carbon Factor (C) | 1.25 | 1.31 | 1.22 | 1.88 |
| Gas Gravity (Air=1) | 1.401 | 1.077 | 1.020 | 0.883 |
| Gasoline, percent by wt. | 35.0 | 29.8 | 25.0 | 24.9 |
| 3-Minute Test (Extrapolated): | | | | |
| Conversion, percent by wt. | 95.0 | 58.0 | 45.5 | 57.0 |
| Coke, percent by wt. | 13.9 | 5.40 | 2.70 | 4.70 |
| Carbon Factor (C) | | 1.28 | 0.83 | 1.14 |

The above table shows that the cracking catalysts of this invention have an exceptionally good steam stability as can be noted by the small decrease in surface area and pore volume caused by the steam treatment. By comparison, the low alumina synthetic and the sulfur-resistant natural catalysts show a large reduction in surface area and pore volume.

In order to determine the hydrocarbon cracking activity and selectivity of the catalysts of this invention, downflow activity tests (Ind. Eng. Chem., 47, 2153 (1955)) were made at 20 minute and 60 minute process times on the catalyst of Example 1 after the above-described steam and $H_2S$ treatment. This test consists of cracking a Mid-Continent light gas oil at 900° F. and at a weight hourly space velocity (weight of oil per hour per weight of catalyst) of 2.0, and distilling the liquid product to give a 410° F. end point gasoline. The conversion is As shown in Table III, even after the steam and $H_2S$ treatment, the catalysts of this invention have an exceptionally high activity, the activity at all process times being about twice that of the sulfur-resistant natural catalyst and about 1.5 times greater than that of the eqilibrium synthetic catalyst. The selectivity of the catalyst of Example 1, as determined by the carbon factor, also appears to be somewhat better than that of either the synthetic or sulfur-resistant natural catalysts.

In order to ascertain more clearly the selectivity or type of product distribution obtained with the catalysts of this invention, analyses for hydrocarbon composition were made of the gas and gasoline produced with the catalyst of Example 1 in the above downflow activity test. In the following table there appears a comparison of the product distribution obtained when using the catalyst of Example 1 with the product distribution obtained using an equilibrium sulfur-resistant natural halloysite catalyst and a somewhat higher boiling Mid-Continent gas oil charge stock in a small scale fluidized catalytic cracking unit described in the article appearing in Ind. Eng. Chem., 46, 1558 (1954).

TABLE IV

| Charge Stock | Mid-Continent Light Gas Oil | | Mid-Continent Heavy Gas Oil | |
|---|---|---|---|---|
| Characterization Factor | 11.96 | | 12.01 | |
| Gravity, ° API | 34.9 | | 27.2 | |
| Aniline Point, ° F | 171 | | 190 | |
| Distillation, Var. Corr. to 760 mm. Hg: | | | | |
| 10% Over at: ° F | 531 | | 609 | |
| 50 | 579 | | 770 | |
| 90 | 684 | | 964 | |
| Catalyst | Catalyst of Ex. 1 | | Equilibrium Sulfur-Resistant Natural | |
| Operating Conditions: | | | | |
| Temperature, ° F | 920 | 920 | 930 | 930 |
| Space Velocity, wt./hr./wt | 2.0 | 2.0 | 2.1 | 0.89 |
| Catalyst-to-Oil Ratio, wt./wt | | | 10.0 | 10.0 |
| Process Time, min | 60 | 20 | | |
| Conversion, percent by wt | 45.9 | 61.3 | 48.6 | 61.0 |
| Yields, percent by wt.: | | | | |
| Debutanized Gasoline | 29.1 | 35.4 | 33.2 | 39.0 |
| iso-pentane | 2.5 | 5.0 | 1.1 | 1.9 |
| n-pentane | 0.4 | 0.5 | 0.4 | 0.7 |
| pentenes | 4.0 | 4.6 | 3.4 | 4.4 |
| $C_6$—400° F | 22.2 | 25.3 | 28.3 | 32.0 |
| Butane-Butene | 8.3 | 12.1 | 5.3 | 7.1 |
| iso-butane | 2.9 | 5.4 | 1.2 | 2.4 |
| n-butane | 0.7 | 1.2 | 0.6 | 0.7 |
| butenes | 4.7 | 5.5 | 3.5 | 4.0 |
| Propane-Propylene | 4.1 | 6.2 | 3.5 | 4.6 |
| propane | 1.4 | 2.3 | 1.3 | 1.8 |
| propylene | 2.7 | 3.9 | 2.2 | 2.8 |
| $C_2$ and Lighter | 2.3 | 3.0 | 3.5 | 4.3 |
| ethane | 0.8 | 1.0 | 1.4 | 0.9 |
| ethylene | 0.5 | 0.6 | 0.8 | 1.6 |
| methane | 0.9 | 1.3 | 1.2 | 1.7 |
| hydrogen | 0.1 | 0.1 | 0.1 | 0.1 |
| Coke | 2.1 | 4.6 | 3.0 | 5.8 |
| Catalytic Gas Oil | 54.1 | 38.7 | 51.4 | 39.0 |
| $H_2S$ | | | 0.1 | 0.2 |

The data in Table IV show that, at about the same conversion, a catalyst of the invention produces about 4 percent less debutanized gasoline, 3 to 5 percent more butane-butene, 0.6 to 1.6 percent more propane-propene, 1.2 percent less dry gas and about 1 percent less coke than does the sulfur-resistant natural catalyst. The product distribution obtained with the catalyst of Example 1 is similar to that obtained with amorphous synethetic silica-alumina composites. The high yield of butane-butene and low yields of dry gas and coke show a very desirable product distribution in fluid catalytic cracking. Analyses of the gasolines produced from the downflow activity test runs made with the catalyst of Example 1 show that these gasolines contained about 35 percent aromatics, 25 percent olefins and 40 percent saturates. In comparison, a gasoline having an ASTM Research clear octane rating of 93 and which was obtained by cracking a gas oil in the small fluid catalytic cracking unit mentioned above contained 25 percent aromatics, 48 percent olefins and 27 percent saturates. The higher aromatic content and lower olefin content of the gasoline product indicates that the catalysts of this invention give gasolines having high octane ratings and good stabilities. From reference to Table II, it will also be noted that these results were obtained with a catalyst which had a rather high sodium content, namely, 0.62 percent by weight. The presence of sodium in cracking catalysts is generally considered to be undesirable, particularly in applications where relatively high particle temperatures are encountered in regeneration, as in fluid catalytic cracking.

In order to demonstrate that the catalysts of this invention have substantial cracking activity even when entirely in the alkali metal ion or alkaline earth metal ion form, a catalyst was prepared, as in the following example, in which substantially all of the exchangeable cations were sodium.

*Example 6*

There was dispersed in distilled water, to obtain a total volume of 85 gallons, 152 pounds of a sodium silicate solution assaying 28.7 percent by weight of $SiO_2$. This solution was then ion-exchanged at a temperature of 150° F. by passing it through a bed of a polystyrene sulfonic acid ion-exchange resin in the hydrogen ion form in order to remove the sodium ion. To the resulting polysilicic acid sol, there was added 40.7 pounds of alumina trihydrate assaying 64.9 percent by weight of $Al_2O_3$, 4 pounds of sodium fluoride and 3.3 pounds of sodium hydroxide. The pH of the resulting slurry was 8.5. The slurry, containing approximately 10 percent by weight of solids, was then heated to 150° F., pumped into an autoclave, and heated over an 8-hour period with stirring to a temperature of 286° C. under autogenous pressure. After maintaining that temperature for 40 hours, the autoclave was allowed to cool until the product temperature dropped to 80° C., a cooling time of 27 hours. Approximately one liter of the product slurry was centrifuged, the supernatant liquid was discarded, the product was redispersed in distilled water, and the centrifugation was repeated. This washing procedure was repeated once again. The final thickened slurry was oven dried at 105° C. Analysis of the product showed its sodium ion content to be 199 milli-equivalents of sodium per 100 grams of sample. It contained substantially no other exchangeable cation. A portion of the product was calcined at 500° C. at atmospheric pressure, and then evacuated at ½ to 1 mm. of mercury at a temperature of 500° C. for a period of two hours. The cracking catalyst so obtained was employed to crack cetane at a temperature of 498° C., a space velocity of 1.7 weights of cetane per hour per weight of catalyst and a reaction time of 30 minutes. The following results were obtained:

| | |
|---|---|
| Liquid products, gms. | 15.39 |
| Gas, gms. | 1.98 |
| Coke, gms. | 0.50 |
| Conversion to all products, percent | 47.5 |
| Conversion to liquid products, percent | 36.7 |
| Ratio: conversion to liquid products/conversion to all products | 0.773 |

The catalyst, although substantially entirely in the sodium ion form, had a good cracking activity as measured by the total conversion and a good selectivity as measured by the high ratio of desirable liquid products obtained to total conversion.

We claim:
1. A hydrocarbon cracking catalyst comprising a synthetic layer type crystalline material having the empirical formula:

2.4 to 3.0SiO$_2$:Al$_2$O$_3$:0.2 to 0.6AB wherein the layer lattices comprise said silica (SiO$_2$), said alumina (Al$_2$O$_3$) and said B;
  wherein A is one equivalent of an exchangeable cation selected from the group consisting of hydrogen, alkali metal, and alkaline earth metal ions, and mixtures thereof; and
  wherein B is one equivalent of an anion selected from the group consisting of fluoride, hydroxyl, and oxygen ions, and mixtures thereof;
  said crystalline material being further characterized by a $d_{001}$ spacing ranging from 9.6 to 10.2 Angstrom units determined at 50% relative humidity and being predominantly ordered in two dimensions.
2. The catalyst of claim 1, wherein A is predominantly hydrogen.
3. A catalyst in accordance with claim 1, wherein said catalyst has the empirical formula:

2.5SiO$_2$:Al$_2$O$_3$:0.5AB and said $d_{001}$ spacing is 9.8 Angstrom units.
4. The catalyst of claim 3, wherein A is predominantly hydrogen.
5. The process which comprises subjecting a hydrocarbon to hydrocarbon catalytic cracking at a temperature of about 600° to 1100° F. and a pressure from substantially atmospheric to about 200 p.s.i. in the presence, as a catalyst, of a synthetic layer type crystalline material having the empirical formula:

2.4 to 3.0SiO$_2$:Al$_2$O$_3$:0.2 to 0.6AB wherein the layer lattices comprise said silica (SiO$_2$), said alumina (Al$_2$O$_3$) and said B;
  wherein A is one equivalent of an exchangeable cation selected from the group consisting of hydrogen, alkali metal, and alkaline earth metal ions, and mixtures thereof; and
  wherein B is one equivalent of an anion selected from the group consisting of fluoride, hydroxyl, and oxygen ions, and mixtures thereof;
  said crystalline material being further characterized by a $d_{001}$ spacing ranging from 9.6 to 10.2 Angstrom units determined at 50% relative humidity and being predominantly ordered in two dimensions.
6. The process of claim 5, wherein said hydrocarbon is a petroleum oil boiling above about 400° F.
7. The process of claim 5, wherein said catalyst has the emipirical formula:

2.5SiO$_2$:Al$_2$O$_3$:0.5AB said $d_{001}$ spacing is 9.8 Angstrom units, and A is predominantly hydrogen.
8. A hydrocarbon cracking catalyst obtained by the dehydration of a synthetic layer-type clay-like mineral having the empirical formula:

$n$SiO$_2$:Al$_2$O$_3$:$m$AB:$x$H$_2$O wherein the layer lattices comprise said silica (SiO$_2$), said alumina (Al$_2$O$_3$), and said B; and wherein
  $n$ is from 2.4 to 3.0,
  $m$ is from 0.2 to 0.6,
  A is one equivalent of an exchangeable cation selected from the group consisting of hydrogen, ammonium, alkali metal, and alkaline earth metal ions, and mixtures thereof, and is external to the lattice;
  B is one equivalent of an anion selected from the group consisting of fluoride, hydroxyl, and oxygen ions, and mixtures thereof, and is internal in the lattice; and
  $x$ is from 2.0 to 3.5 at 50% relative humidity;
  said mineral being characterized by a $d_{001}$ spacing at said humidity within the range which extends from a lower limit of about 10.4 Angstrom units to an upper limit of about 12.0 Angstrom units when A is monovalent, to about 14.7 Angstrom units when A is divalent, and to a value intermediate between 12.0 and 14.7 Angstrom units when A includes both monovalent and divalent cations;
  said catalyst being characterized by a $d_{001}$ spacing ranging from 9.6 to 10.2 Angstrom units at 50% relative humidity regardless of the valency of A and being predominantly ordered in two dimensions.
9. A process of preparing a catalyst which comprises dehydrating a synthetic layer-type clay-like mineral having the empirical formula:

$n$SiO$_2$:Al$_2$O$_3$:$m$AB:$x$H$_2$O wherein the layer lattices comprise said silica (SiO$_2$), said alumina (Al$_2$O$_3$), and said B; and wherein
  $n$ is from 2.4 to 3.0,
  $m$ is from 0.2 to 0.6,
  A is one equivalent of an exchangeable cation selected from the group consisting of hydrogen, ammonium, alkali-metal, and alkaline earth metal ions, and mixtures thereof, and is external to the lattice;
  B is one equivalent of an anion selected from the group consisting of fluoride, hydroxyl, and oxygen ions, and mixtures thereof, and is internal in the lattice; and
  $x$ is from 2.0 to 3.5 at 50% relative humidity;
  said mineral being characterized by a $d_{001}$ spacing at said humidity within the range which extends from a lower limit of about 10.4 Angstrom units to an upper limit of about 12.0 Angstrom units when A is monovalent, to about 14.7 Angstrom units when A is divalent, and to a value intermediate between 12.0 and 14.7 Angstrom units when A includes both monovalent and divalent cations;
  said catalyst being characterized by a $d_{001}$ spacing ranging from 9.6 to 10.2 Angstrom units at 50% relative humidity regardless of the valency of A and being predominantly ordered in two dimensions.
10. The process of claim 9, wherein said dehydration is conducted at a temperature in the range 600° to 1450° F.
11. The process of claim 9, wherein said dehydration is conducted at a temperature in the range 700° to 1200° F.
12. The process which comprises subjecting a hydrocarbon to hydrocarbon catalytic cracking at a temperature of about 600° to 1100° F. and a pressure from substantially atmospheric to about 200 p.s.i. in the presence of a hydrocarbon cracking catalyst obtained by the dehydration of a synthetic layer-type, clay-like mineral having the empirical formula:

$n$SiO$_2$:Al$_2$O$_3$:$m$AB:$x$H$_2$O wherein the layer lattices comprise said silica (SiO$_2$), said alumina (Al$_2$O$_3$), and said B; and wherein
  $n$ is from 2.4 to 3.0,
  $m$ is from 0.2 to 0.6,
  A is one equivalent of an exchangeable cation selected from the group consisting of hydrogen, ammonium, alkali metal, and alkaline earth metal ions, and mixtures thereof, and is external to the lattice;
  B is one equivalent of an anion selected from the group consisting of fluoride, hydroxyl, and oxygen ions, and mixtures thereof, and is internal in the lattice; and
  $x$ is from 2.0 to 3.5 at 50% relative humidity;
  said mineral being characterized by a $d_{001}$ spacing at said humidity within the range which extends from a lower limit of about 10.4 Angstrom units to an upper limit of about 12.0 Angstrom units when A is monovalent, to about 14.7 Angstrom units when A is divalent, and to a value intermediate between 12.0 and 14.7 Angstrom units when A includes both monovalent and divalent cations;

said catalyst being characterized by a $d_{001}$ spacing ranging from 9.6 to 10.2 Angstrom units at 50% relative humidity regardless of the valency of A and being predominantly ordered in two dimensions.

References Cited by the Examiner

UNITED STATES PATENTS

| | | | |
|---|---|---|---|
| 3,033,778 | 5/1962 | Frilette | 208—120 |
| 3,119,763 | 1/1964 | Haas et al. | 208—109 |
| 3,140,251 | 7/1964 | Plank et al. | 208—120 |

FOREIGN PATENTS 1,098,929  2/1961  Germany.

References Cited by the Applicant

UNITED STATES PATENTS 2,882,244  4/1959  Milton.

DELBERT E. GANTZ, *Primary Examiner.*

ALPHONSO D. SULLIVAN, PAUL M. COUGHLAN, *Examiners.*

A. RIMENS, *Assistant Examiner.*